United States Patent Office 3,450,498
Patented June 17, 1969

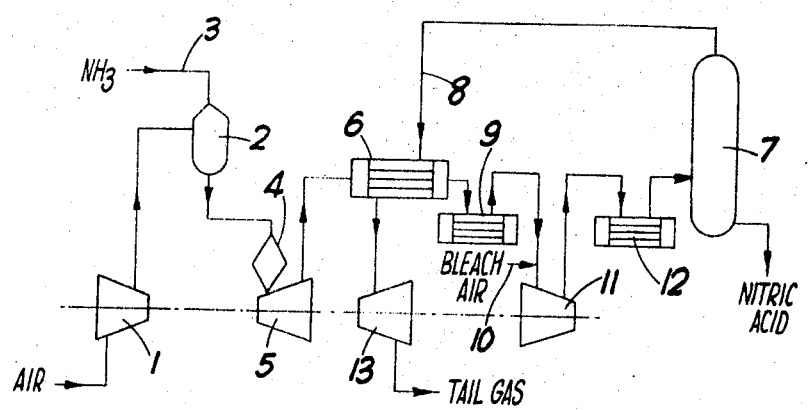

3,450,498
PROCESS FOR THE MANUFACTURE
OF NITRIC ACID
Peter Malcolm Sales, London, England, assignor to
Humphreys & Glasgow Limited, London, England,
a British company
Filed May 27, 1966, Ser. No. 553,462
Claims priority, application Great Britain, May 28, 1965,
22,818/65
Int. Cl. C01b 21/38; C02b 21/26
U.S. Cl. 23—162                              3 Claims

ABSTRACT OF THE DISCLOSURE

In an ammonia oxidation plant for the production of nitric acid, the oxidation reaction gases are expanded directly through a gas turbine used in the energy recovery system. The gases are subsequently compressed, preferably passed through a heat exchanger, and the oxides of nitrogen absorbed in water. The tail gases, heated in the heat exchanger may then be expanded through a further turbine.

---

This invention relates to processes and apparatus for the manufacture of nitric acid, in particular by oxidation of ammonia. More particularly it is concerned with the recovery for process purposes of reaction energy liberated in the said oxidation of ammonia.

The oxidation of ammonia is highly exothermic and in accordance with the equation representing the overall reaction.

$$NH_3 + 2O_2 \rightarrow NHO_3 + H_2O$$

there is theoretically an energy output equivalent to 1880 kilowatt hours per ton of 100% nitric acid produced.

Mainly because of the technical aspects of the two distinct stages in which the reaction is carried out, and economic considerations in the design and arrangement of plant for operating in this manner it is rare that the actual surplus energy recoverable in present day large scale operation amounts to as much as the equivalent of 100 kw.-hr. per ton of 100% nitric acid made. Usually it is substantially less than this, and sometimes the energy balance may actually be negative.

Generally the ammonia is oxidised with air over a platinum catalyst at a temperature of 700 to 1,000° C. and at a pressure varying from atmospheric to 20 atmospheres. The reaction involved is $$4NH_3 + 5O_2 \rightarrow 4NO + 6H_2O$$

Any increase in pressure is unfavourable to the efficiency of this step and catalyst losses are also increased. Therefore a low conversion pressure is desirable to minimise operating costs, subject to the condition that the size and capital cost of the plant do not become excessive.

The nitric oxide produced in the above reaction is further oxidised to nitrogen peroxide, which in turn reacts with water, and while the mechanism of the absorption/oxidation reactions is complex the overall reaction can be represented thus:

$$2H_2O + 4NO + 3O_2 \rightarrow 4HNO_3$$

In this stage of the process for the manufacture of nitric acid an increase in pressure is highly advantageous and generally it is agreed for instance that the size of the absorption apparatus necessary for a given duty is proportional to the inverse square of the total partial pressure of the nitrogen oxides. Its size also decreases with decrease in the operating temperature, normally about atmospheric.

A further advantage of high pressure and low temperature in the absorption stage is that a more highly concentrated nitric acid can be made which can be a benefit in subsequent uses.

In order that the partial pressure of nitrogen oxide may be as high as possible in the gas passed to the absorption stage it is desirable that the water produced in the oxidation stage should be condensed out by condensation with a minimum nitric acid content; this is favoured by low pressure.

Various pressure combinations are used in present day commercial nitric acid plants for operating the oxidation and absorption stages but broadly there are two categories; those operating at constant pressure and those operating at different pressures for the two stages.

Constant pressure plants are known working at atmospheric pressure but these are now obsolete and more frequently a constant pressure in the range from 3 to 12 atmospheres absolute is used. Energy recovery systems vary in design but generally such plants cease to be self-supporting in energy at 4 to 8 atmospheres absolute pressure depending upon the degree of refinement of the energy recovery system, and beyond that point there has to be a major importation of energy in the form of electricity, or steam or fuel.

Mixed pressure plants are known operating at about 1 at. absolute pressure for the oxidation stage and 3 to 4 ats. absolute for the absorption stage. Some operate at 3 atmospheres pressure for oxidation and 8 atmospheres for absorption. While these plants have advantage over constant pressure plants in operating costs their energy requirements are of a similar order.

Similar systems of energy recovery are used on all known commercial nitric acid plants. Thus, the power for compressing gas (either air or nitrous gases, or both) is derived from a combination of expansion of tail gas through a gas turbine with additional drive by steam or gas turbine, or perhaps electric motor, to provide the additional power required. The actual proportioning of power between the expansion turbine and additional drive varies according to the arrangements for heat exchange used on the particular plant.

The gases from the conversion catalyst are at a temperature level (700 to 1,000° C.) where their handling is difficult and standard materials of construction for instance for heat exchangers can only be used if the metal temperature is kept sufficiently low. Accordingly, it is almost universal practice to install a waste heat boiler immediately after the catalyst.

An energy recovery system thus may comprise steam production after the conversion of $NH_3$ to NO, followed typically by heat exchange with the tail gas from the absorption stage of the process. Expansion of the tail gas in a gas turbine then provides up to 60% of required compressor power depending upon the temperature of the tail gas attained in heat exchange. From this it follows that only in the form of steam can there be surplus energy available from the plant and that the quantity available depends on the operating pressure of the plant and whether electrical energy is imported as supplementary power for the compressors.

With this general arrangement the import of energy becomes necessary on a considerable scale during a start up period, for two main reasons in addition to the fact that at start up no power is available from tail gas expansion; these reasons are:

(1) The waste heat boiler system has to be heated up before start up in order to avoid corrosion which would result from condensation of nitric acid.

(2) The compressor set has to be started prior to ignition of the ammonia/air mixture on the catalyst. When the drive for the set is by steam turbine the amount of steam is particularly large because of the poor efficiency of steam turbines at low speeds. In the case of electric motors the start up power required sometimes exceeds normal operating power due to their constant speed design.

Thus, in prior practice there must be heavy expenditure on packaged boilers or electrical power supplies in order to start up the plant, even if the plant is so designed that it is self supporting in energy during normal operation or exports it.

It is apparent that the fundamental reason for the inefficient recovery of energy in known plants is that the useful available heat from the conversion reaction is largely degraded before energy recovery because of problems of constructional materials.

The present invention as hereinafter exemplified enables the efficiency of energy recovery particularly from the ammonia oxidation stage of the process to be increased, and in accordance with the invention there is provided a process for the manufacture of nitric acid by the catalytic oxidation of ammonia wherein the oxidation stage of the process is performed at a gas turbine operating pressure and wherein the hot reaction gases produced in the oxidation stage and at a suitable gas turbine inlet temperature are expanded in a gas turbine to recover energy without intermediate use in a steam raising or other heat exchange operation.

The temperature of the reaction gases may be adjusted to a suitable gas turbine inlet temperature by, for example, the use of an appropriate proportion of ammonia to air in the oxidation stage of the process or by addition of air to the said reaction gases after the catalytic oxidation stage. Preferably the temperature of the said reaction gases is adjusted to the maximum practical turbine inlet temperature.

In accordance with this invention the hot reaction gases produced in the oxidation stage are expanded directly in the gas turbine, that is without intermediate use in steam raising or other heat exchange operation.

The present invention further provides an apparatus for the manufacture of nitric acid by the catalytic oxidation of ammonia which apparatus comprises catalytic means for catalytically oxidising ammonia with air said catalytic means being connected directly to a gas turbine which, when in use, is capable of expanding the hot gases produced by the said catalytic means to recover energy, the apparatus further comprising apparatus suitable for producing nitric acid from the said gases.

Generally, the temperature of the said reaction gases at the inlet to the turbine is from 700 to 800° C.; also the gas turbine operating pressure may be of the order of 3 to 6 atmospheres absolute.

The extent of expansion of the reaction gases in the gas turbine, and the pressure of the gases leaving the turbine may be controlled to suit the requirements of any particular apparatus, but preferably the pressure is substantially atmospheric pressure.

The temperature of the gases at the outlet of the gas turbine will be high, and preferably sensible heat is extracted from them in heat exchange with the tail gases from the absorption stage, prior to the said tail gases being expanded in a final expansion turbine.

After heat exchange with the tail gases the reaction gases from the oxidation stage are still further cooled, and the resulting dilute nitric acid condensate is separated and removed from the nitrous gases.

The mixture of gases together with secondary air to oxidise nitric oxide to nitrogen peroxide are then compressed suitably for the absorption stage, preferably within the range from 3 to 20 atmospheres.

After the absorption stage the tail gases are preferably passed to heat exchange with the oxidation reaction gases leaving the first gas turbine, and thereafter expanded in a final expansion turbine.

The process of the invention has many advantages over conventionally adopted practice, and foremost is the considerably higher efficiency achieved in available energy utilisation, which may be effected to advantage in one of two ways, namely:

(1) By operating the absorption section at higher pressures than are normally commercially feasible, thus reducing the cost of the plant and producing high strength acid.

(2) By operating the absorption section at conventional pressure, and exporting the surplus energy directly in the form of shaft horsepower, or converting this to electrical energy.

As an example of the second method, when the reaction gases from the oxidation stage are at about 4 atmospheres absolute pressure and are expanded in the gas turbine down to atmospheric pressure, the energy output of the air compressor-turbine shaft would be about 200 to 250 kw. hr. per ton of nitric acid made by the plant.

Additionally in view of the high temperature of the reaction gases leaving the gas turbine, and the use which can be made of this fact in heat exchange with the tail gases from the absorption stage before these are expanded in the final expansion turbine, the power requirement of the nitrous gas compressor-tail gas expansion turbine shaft can be restricted to 50 kw. hr. per ton of nitric acid, thus allowing 150 to 200 kw. hr. per ton of nitric acid to be extracted from the shaft of the compressor unit.

No waste heat boiler or other steam-raising system is required and this together with the smaller size of the absorption stage permits simplification of the plant layout.

The problems of starting up of the plant are much simplified, the compressor set being readily started in the manner of a gas turbine, and there is no need for a large input of energy in the form of steam of electrical power.

The combination of decompression of the ammonia oxidation gases down to atmospheric pressure, followed by recompression after cooling by heat exchange not only enables the main object of the invention to be achieved, but also presents the opportunity for condensing out at a low pressure the water of reaction produced in the ammonia oxidation stage, thus increasing the concentration of nitrogen oxides in the gases for absorption with a minimum loss of nitric acid in the condensate.

The invention will now be described by way of example with reference to the accompanying drawing which is a diagrammatic representation of an application of the process of the invention in which air from the compressor 1 is passed to the mixer/filter chamber 2 where it is mixed with gaseous ammonia from the supply line 3. The compressed mixture which comprises ammonia and air at 4 ats. pressure in the correct proportions for the required adjustment of the temperature of the oxidation product gases is passed into the catalyst chamber 4, and the product gases enter the gas turbine 5 at an inlet temperature of about 800° C.

In the heat exchanger 6, the gases which leave the turbine 5 at atmospheric pressure and a temperature of about 500° C. preheat the tail gases from the absorber 7 which enter the exchanger through the supply line 8 at ambient temperature and a pressure of 9 ats. absolute.

The cooled oxidation product gases are then additionally cooled in the cooler 9 where aqueous condensate is separated out and removed. After this the gases are mixed with a secondary air from supply line 10 for oxidation of nitric oxide to nitrogen peroxide, and the mixture is compressed in compressor 11 to 9.5 atmospheres, cooled in cooler 12 and passed into the absorber 7.

The tail gases from 7, which have been heated up to about 450° C. by heat exchange in 6 with the oxidation gases from outlet of turbine 5, are expanded in the final expansion turbine 13 and leave it at a temperature of about 150° C.

Under the foregoing conditions there can be a total energy recovery from the drive shaft of the turbine-compressor assembly equivalent to some 120 to 150 k.w.hr. per ton of 100% nitric acid made in the plant.

I claim:
1. A process for the manufacture of nitric acid by the catalytic oxidation of ammonia said process consisting essentially of the following steps:
  (a) passing a mixture of ammonia and air over an oxidation catalyst at a pressure of from 3 to 8 atmospheres and at a temperature of from 700 to 1000° C.;
  (b) expanding the resulting reaction gases directly in a gas turbine to substantially atmospheric pressure while maintaining the temperature above about 500° C.;
  (c) cooling the reaction gases and compressing them to a pressure of from 3 to 20 atmospheres and
  (d) absorbing the reaction gases thus compressed, in water to produce nitric acid.

2. A process as claimed in claim 1 wherein the temperature of the reaction gases entering the gas turbine is controlled by adjusting the proportion of air present in the reaction gases.

3. A process as claimed in claim 1 wherein the reaction gases leaving the gas turbine and prior to absorption by water are subjected to heat exchange with tail gases from the absorption step of the process, the said tail gases being thereafter expanded in a second gas turbine.

References Cited

UNITED STATES PATENTS

| | | | |
|---|---|---|---|
| 635,919 | 10/1899 | Curtis | 23—162 XR |
| 952,248 | 3/1910 | Howard | 23—163 |
| 1,304,707 | 5/1919 | Rabinovitz | 23—162 |
| 2,850,361 | 9/1958 | Austin | 23—162 XR |
| 2,942,953 | 6/1960 | Shields | 23—162 XR |
| 2,955,917 | 10/1960 | Roberts et al. | 23—162 |
| 3,003,851 | 10/1961 | Winn | 23—162 |
| 3,101,255 | 8/1963 | Carr et al. | 23—162 |

FOREIGN PATENTS 360,778  11/1931  Great Britain.

OSCAR R. VERTIZ, *Primary Examiner.*

G. O. PETERS, *Assistant Examiner.*

U.S Cl. X.R.

23—260